(12) United States Patent
Lee et al.

(10) Patent No.: US 7,933,370 B2
(45) Date of Patent: Apr. 26, 2011

(54) MULTIPLE INPUT MULTIPLE OUTPUT (MIMO) RECEIVER AND SIGNAL DETECTION METHOD THEREOF

(75) Inventors: Jeong-Taek Lee, Seoul (KR); Eoi-Young Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 12/050,625

(22) Filed: Mar. 18, 2008

(65) Prior Publication Data

US 2009/0097598 A1 Apr. 16, 2009

(30) Foreign Application Priority Data

Oct. 11, 2007 (KR) ........................ 10-2007-0102624

(51) Int. Cl.
*H03D 1/04* (2006.01)
*H04L 17/14* (2006.01)
(52) U.S. Cl. ....................... 375/346; 375/340
(58) Field of Classification Search ............. 375/260, 375/262, 267, 316, 324, 340–343, 346–349, 375/359, E11.02, E1.024, E1.025, E1.029, 375/E1.03; 329/318–32; 455/63.1, 296
See application file for complete search history.

(56) References Cited

U.S. PATENT DOCUMENTS

| | | | | |
|---|---|---|---|---|
| 7,555,035 B2 * | 6/2009 | Shi et al. | | 375/211 |
| 2006/0210070 A1 | 9/2006 | Reznik et al. | | |
| 2006/0268963 A1 | 11/2006 | Yoshida | | |
| 2006/0285531 A1 * | 12/2006 | Howard et al. | | 370/343 |
| 2007/0230373 A1 * | 10/2007 | Li et al. | | 370/267 |
| 2007/0291868 A1 * | 12/2007 | Olesen et al. | | 375/267 |
| 2007/0291882 A1 * | 12/2007 | Park et al. | | 375/347 |
| 2008/0018535 A1 * | 1/2008 | Hwang et al. | | 342/368 |
| 2008/0219376 A1 * | 9/2008 | Qi et al. | | 375/285 |
| 2009/0060078 A1 * | 3/2009 | van Zelst et al. | | 375/262 |
| 2009/0080508 A1 * | 3/2009 | Gore et al. | | 375/232 |
| 2010/0150279 A1 * | 6/2010 | Arar | | 375/340 |

FOREIGN PATENT DOCUMENTS

KR 10-2005-0065499 6/2005
KR 10-2006-0108450 10/2006

OTHER PUBLICATIONS

Bohnke et al., Reduced Complexity MMSE Detection For Blase Architectures, 2003, Global Telecommunications Conference, 2003. GLOBECOM '03. IEEE, vol. 4, pp. 2258-2262.*

Namjeong et al., Reduced Complexity Stacked-Based Limited Tree Searching Algorithm For V-Blast Systems, 2006, Military Communications Conference, 2006. MILCON 2006. IEEE, pp. 1-5.*

(Continued)

*Primary Examiner* — Tesfaldet Bocure
*Assistant Examiner* — Lawrence B Williams
(74) *Attorney, Agent, or Firm* — NSIP Law

(57) ABSTRACT

A Multiple Input Multiple Output (MIMO) receiver and a signal detection method thereof are provided. Since no square root calculation needs to be performed when a calculation for detecting a transmission signal is performed using a Zero Forcing-Sorted QR Decomposition (ZF-SQRD) algorithm and a Minimum Mean Square Error-Sorted QR Decomposition (MMSE-SQRD) algorithm, the complexity of a calculation for detecting a transmission signal under a MIMO channel environment can be reduced.

20 Claims, 6 Drawing Sheets

OTHER PUBLICATIONS

Muruganathan et al., A Computationally Efficient QR-Successive Interference Cancellation Scheme for Simplified Receiver Implementation in SFBC-OFDM Systems, 2007, Wireless Communications, IEEE Transactions on, vol. 6, Issue : 10, pp. 3641-3647.*

English language abstract of KR 10-2006-0108450, published Oct. 18, 2006.
English language abstract of KR 10-2005-0065499, published Jun. 29, 2005.

* cited by examiner

MULTIPLE INPUT MULTIPLE OUTPUT (MIMO) RECEIVER AND SIGNAL DETECTION METHOD THEREOF

CROSS REFERENCE TO RELATED APPLICATIONS

This application claims priority from Korean Patent Application No. 10-2007-0102624, filed on Oct. 11, 2007, the disclosure of which is incorporated herein in its entirety by reference.

BACKGROUND OF THE INVENTION

1. Field of the Invention

The present invention relates to a Multiple Input Multiple Output (MIMO) technique, and more particularly, to a Multiple Input Multiple Output (MIMO) receiver for detecting a transmission signal through QR decomposition of MIMO channel information, and a signal detection method thereof.

2. Description of the Related Art

Current wireless communication systems focus on transmitting high quality, large capacity multimedia data at a limited frequency range. Techniques for transmitting a large amount of data using a limited frequency range have been developed, and a representative technique among such techniques is a Multiple Input Multiple Output (MIMO) system.

A MIMO system includes a plurality of antennas at its transmitting and receiving terminals to form a plurality of independent fading channels, and transmits different signals through the respective transmitting antennas, thereby greatly improving data transmission speed. Therefore, the MIMO system can transmit a large amount of data without having to increase the number of available frequency bands.

MIMO systems can be classified into a Diagonal Bell Labs Layered Space-Time (D-BLAST) MIMO system and a Vertical Bell Labs Layered Space-Time (V-BLAST) MIMO system.

The D-BLAST MIMO system can obtain spatial multiplexing gain and transmission/reception multiplexing gain, but cannot be easily implemented. The V-BLAST MIMO system has been developed to improve the complexity in implementing the D-BLAST MIMO system. The V-BLAST MIMO system can obtain spatial multiplexing gain and reception diversity gain with relatively low complexity.

The V-BLAST MIMO system utilizes Successive Interference Cancellation (hereinafter, referred to as "SIC") in order to detect a transmission signal received through a MIMO channel. The SIC technique multiples a received signal vector by a zero-forcing nulling vector, thus nulling interference.

However, the SIC technique has to calculate pseudo-inverse matrixes several times. Therefore, as the number of antennas increases, calculations become complicated, which makes implementation of a MIMO system difficult.

SUMMARY OF THE INVENTION

The present invention provides a receiver for a Multiple Input Multiple Output (MIMO) system, which can reduce the complexity of calculations for detecting a transmission signal by avoiding calculation of pseudo-inverse matrixes, and a signal detection method thereof.

The present invention discloses a MIMO receiver which transforms orthonormal matrixes Q' and R' into orthogonal matrixes Q and R using a diagonalized normalization matrix in Zero Forcing-Sorted QR Decomposition (ZF-SQRD), and performs Successive Interference Cancellation (SIC) using the orthogonal matrixes Q and R, thereby detecting a transmission signal, and a signal detection method thereof.

Also, the present invention discloses a MIMO receiver which decomposes an extended channel matrix including channel information and received noise information into extended orthonormal matrixes Q and R, selects some elements of the extended orthonormal matrix Q to generate an orthonormal subset matrix Q1, transforms the orthonormal subset matrix Q1 and the extended orthonormal matrix R into orthogonal subset matrixes Q1 and R using a diagonalized normalization matrix, and performs SIC using the orthogonal subset matrixes Q and R, thereby detecting a transmission signal, in MMSE (Minimum Mean Square Error)-SQRD, and a signal detection method thereof.

According to an aspect of the present invention, there is provided a Multiple Input Multiple Output (MIMO) receiver including: a channel estimator decomposing a channel matrix including channel information associated with a transmitting party into orthonormal matrixes Q' and R', and transforming the decomposed orthonormal matrixes Q' and R' into orthogonal matrixes Q and R using a diagonalized normalization matrix; and a detector performing Successive Interference Cancellation (SIC) using the orthogonal matrixes Q and R, thus detecting a transmission signal transmitted from the transmitting party.

The channel estimator obtains the orthogonal matrixes Q and R by using the diagonalized normalization matrix, without having to perform a square root calculation.

The diagonalized normalization matrix is a matrix whose each diagonal element is a reciprocal of a norm of each column of the orthogonal matrix Q.

According to another aspect of the present invention, there is provided a Multiple Input Multiple Output (MIMO) receiver including: a channel estimator decomposing an extended channel matrix including received noise information and channel information associated with a transmitting party into extended orthonormal matrixes Q and R, selecting some elements of the extended orthonormal matrix Q to generate an orthonormal subset matrix Q1, and transforming the orthonormal subset matrix Q1 and the extended orthonormal matrix R into an orthogonal subset matrix Q1 and an extended matrix R using a diagonalized normalization matrix; and a detector performing Successive Interference Cancellation (SIC) using the orthogonal subset matrix Q1 and the extended matrix R, thus detecting a transmission signal transmitted from the transmitting party.

According to another aspect of the present invention, there is provided a method of detecting a signal in a Multiple Input Multiple Output (MIMO) receiver, including: decomposing a channel matrix including channel information associated with a transmitting party, into orthonormal matrixes Q' and R'; transforming the orthonormal matrixes Q' and R' into orthogonal matrixes Q and R using a diagonalized normalization matrix; and performing Successive Interference Cancellation (SIC) using the orthogonal matrixes Q and R, thus detecting a transmitting matrix transmitted from the transmitting party.

According to another aspect of the present invention, there is provided a method of detecting a signal in a Multiple Input Multiple Output (MIMO) receiver, including: decomposing an extended channel matrix including received noise information and channel information associated with a transmitting party, into extended orthonormal matrixes Q and R; selecting some elements of the extended orthonormal matrix Q to generate an orthonormal subset matrix Q1, and transforming the orthonormal subset matrix Q1 and the extended orthonormal matrix R into an orthogonal subset matrix Q1 and an extended matrix R, using a diagonalized normalization matrix; and performing Successive Interference Cancellation (SIC) using the orthogonal subset matrix Q1 and the extended matrix R, thus detecting a transmission signal transmitted from the transmitting party.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
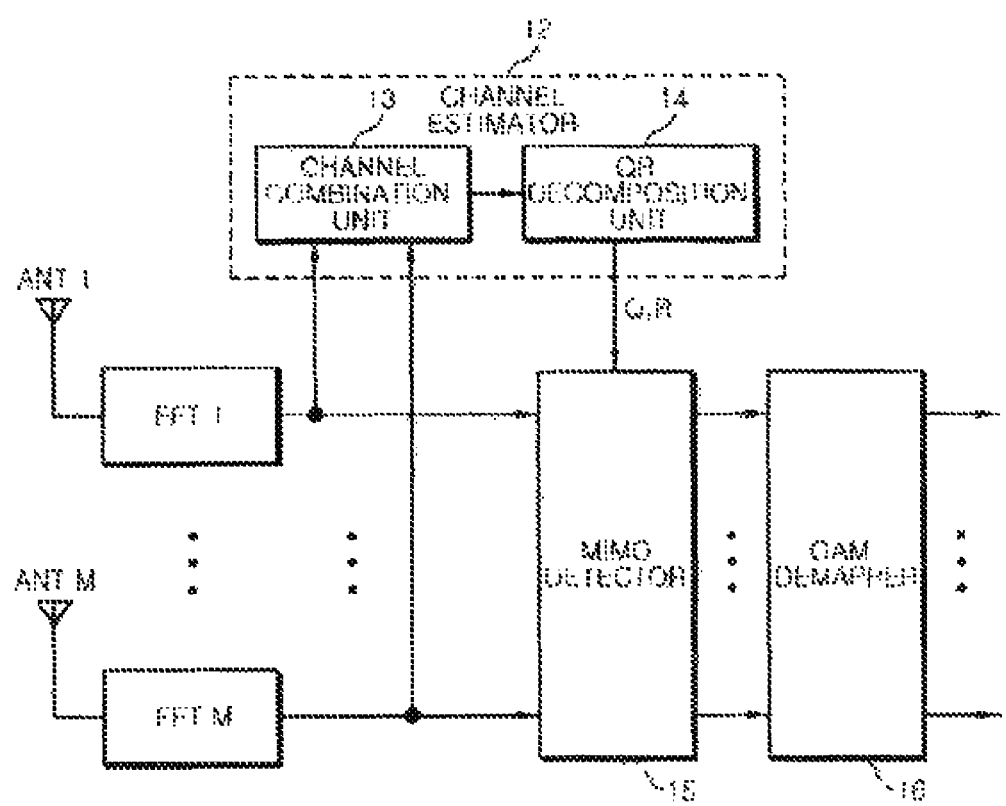
FIG. 1 is a block diagram of a Multiple Input Multiple Output (MIMO) receiver according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram of a Multiple Input Multiple Output (MIMO) receiver according to an embodiment of the present invention.

As illustrated in FIG. 1, the MIMO receiver decomposes a channel matrix into orthonormal matrixes Q' and R' using a Zero Forcing-Sorted QR Decomposition (ZF-SQRD) algorithm, transforms the orthonormal matrixes Q' and R' into orthogonal matrixes Q and R using a diagonalized normalization matrix, and performs Successive Interference Cancellation (SIC) using the orthogonal matrixes Q and R, thereby detecting a transmission signal.

The process will be described in detail with the appended drawings.

The MIMO receiver illustrated in FIG. 1 includes a plurality of receiving antennas ANT1, . . . , ANTM, a plurality of Fast Fourier Transform (FFT) calculators FFT1 through FFTM which are respectively connected to the receiving antennas ANT1 through ANTM, a channel estimator 12, a MIMO detector 15, and a quadrature amplitude modulation (QAM) demapper 16.

The FFT calculators FFT1 through FFTM perform FFT on signals that are received through the receiving antennas ANT1 through ANTM, to demodulate them to M pieces of channel data in a frequency domain.

The channel estimator 12 includes a channel combination unit 13 and a QR decomposition unit 14. The channel combination unit 13 generates a channel matrix H using the M pieces of channel data which are demodulated by the FFT calculators FFT1 through FFTM.

The QR decomposition unit 14 decomposes the channel matrix H into orthonormal matrixes Q' and R', decomposes the orthonormal matrix Q' into an orthogonal matrix Q and a diagonalized normalization matrix $\Sigma^{-1/2}$, and decomposes the orthonormal matrix R' into an orthogonal matrix R and a diagonalized normalization matrix $\Sigma^{-1/2}$.

Here, the diagonalized normalization matrix $\Sigma^{-1/2}$ can be expressed by Equation 1.

$$\Sigma^{-1/2} = \begin{bmatrix} \|q_1\|^{-1} & & \\ & \ddots & \\ & & \|q_N\|^{-1} \end{bmatrix} \quad (1)$$

The diagonalized normalization matrix $\Sigma^{-1/2}$ is a matrix whose each diagonal element is the reciprocal of a norm of each column of the orthonormal matrix Q'.

Meanwhile, an element q' of the orthonormal matrix Q' and an element q of the orthogonal matrix Q are in a relationship which is expressed by Equation 2.

$$q'_n = \frac{q_n}{\|q_n\|} \quad (2)$$

Hereinafter, the QR decomposition unit 14 calculates the orthogonal matrixes Q and R. An exemplary algorithm for obtaining the orthogonal matrixes Q and R is as follows.

```
(1) R = 0, Q = H, p = (1,...,N)
(2) for i = 1,...,N
(3)     E_i = || q_i ||^2           Mult : 2M, Add : M-1
(4) end
(5) for i = 1,...,N
(6)     k_i = argmin_{s=i,...,N} E_s
(7)     exchange column i and k_i in Q, R, and p, E
(8)     r_{i,i} = E_i
(9)     if (i < N) u_i = 1/r_{i,i}       Div: 1
(10)        for j = i + 1,...,N
(11)            r_{i,j} = q_i^H q_j        Mult : 3M, Add: 2M-2
(12)            q_j = q_j - u_i r_{i,j} q_i  Mult: 3M+2, Add: 2M
(13)            E_j = E_j - u_i r_{i,j}^2   Mult: 3, Add: 1
(14)        end
(15) end
```

That is, the QR decomposition unit 14 initializes the orthogonal matrix R, the channel matrix H, the orthogonal matrix Q, and a permutation value p so that R=0, H=Q, and p=1, . . . , N, in step (1) of the algorithm.

Then, in steps (2) through (15) of the algorithm, the QR decomposition unit 14 calculates the square of a norm of each column of the channel matrix H, exchanges the columns of each of the orthogonal matrixes Q and R in an ascending order from a minimum of the squares of the norms, and calculates the values of the columns of the orthogonal matrixes Q and the values of the elements of the orthogonal matrix R.

Here, an element $r_{i,j}$ of the orthogonal matrix R is obtained using $q_i^H q_j$, and a column $q_i$ of the orthogonal matrix Q is obtained using $r_{i,j} q_j / r_{i,j}$. Also, i=1, ..., N (N is a natural number), j=i+1, ..., N (N is a natural number), and $q_i^H$ is the Hermitian of $q_i$. Also, the matrixes R' and R can be expressed by Equation 3.

$$R' = \begin{bmatrix} (q_1)^H h_1 & (q_1)^H h_2 & \cdots & (q_1)^H h_N \\ & (q_2)^H h_2 & \cdots & (q_2)^H h_N \\ & & \ddots & \vdots \\ 0 & & & (q_N)^H h_N \end{bmatrix} \quad (3)$$

$$R = \begin{bmatrix} (q_1)^H h_1 & (q_1)^H h_2 & \cdots & (q_1)^H h_N \\ & (q_2)^H h_2 & \cdots & (q_2)^H h_N \\ & & \ddots & \vdots \\ 0 & & & (q_N)^H h_N \end{bmatrix}$$

Accordingly, an element $r'_{i,j}$ of the orthogonal matrix R' can be expressed by Equation 4.

$$r_{ij} = (q_i)^H h_j = \frac{(q_i)^H}{\|q_i\|} h_j \quad (4)$$

The MIMO detector 15 performs SIC using the orthogonal matrixes Q and R calculated by the channel estimator 12, thereby detecting a transmission signal.

This operation will be described in detail below.

A received signal y can be represented by a multiplication (y=Hx) of a channel matrix H and a transmission signal x.

Since the channel matrix $H=Q'R'=Q\Sigma^{-1/2}\Sigma^{-1/2}R$, $y=Hx=Q\Sigma^{-1/2}\Sigma^{-1/2}Rx$. Here, since $(Q\Sigma^{-1/2})^H y = (Q\Sigma^{-1/2})^H (Q\Sigma^{-1/2})\Sigma^{-1/2}Rx$, $\Sigma^{-1/2}Q^H y = \Sigma^{-1/2}Rx$, and $Q^H y = Rx$, the transmission signal x can be obtained using $Q^H y=Rx$. That is, in the MIMO receiver, the diagonalized normalization matrix $\Sigma^{-1/2}$ is eliminated when the transmission signal x is detected from the Equation $Q^H y=Rx$. The transmission signal x can be obtained without having to perform a square root calculation.

Accordingly, since no complicated square root calculation is needed, the complexity of a calculation for detecting a transmission signal under a MIMO channel environment can be reduced.

Meanwhile, the QAM demapper 16 maps the M pieces of channel data to the original bit data according to a QAM modulation method.

Figure 2:
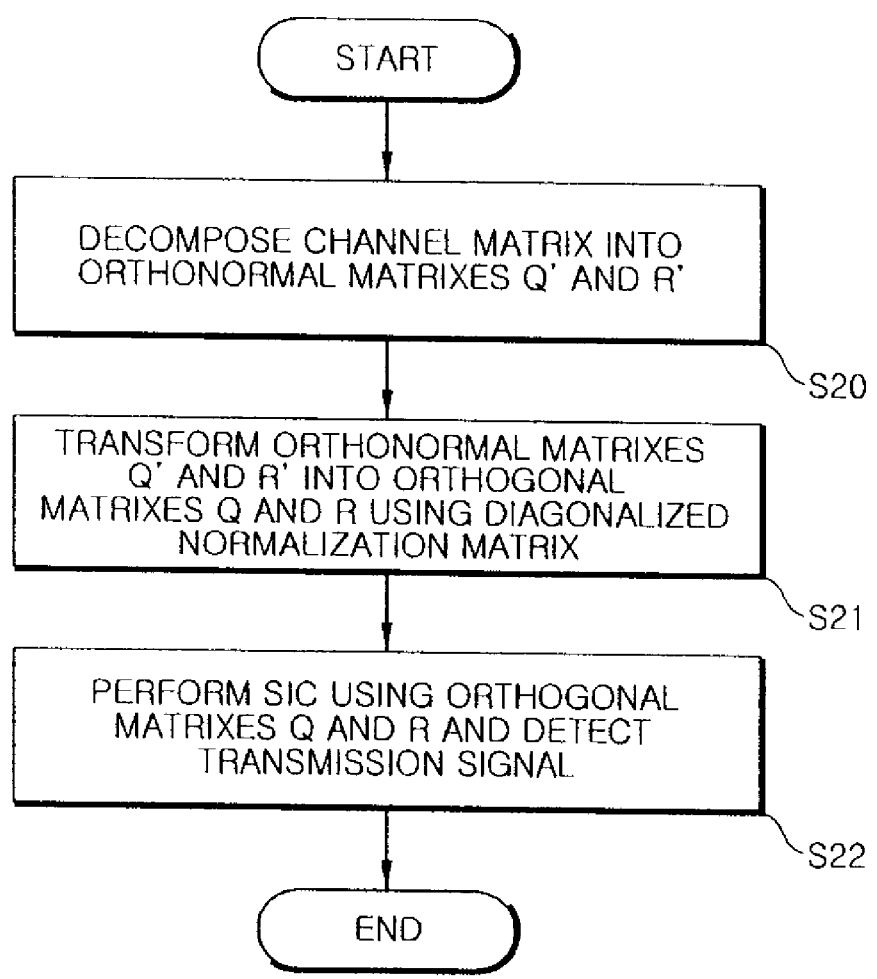
FIG. 2 is a flowchart of a signal detection method which is performed by the MIMO receiver illustrated in FIG. 1, according to an embodiment of the present invention.

FIG. 2 is a flowchart of a signal detection method which is performed by the MIMO receiver illustrated in FIG. 1, according to an embodiment of the present invention.

Referring to FIG. 2, the MIMO receiver decomposes a channel matrix including channel information associated with a transmitting party into orthonormal matrixes Q' and R' (operation S20).

Then, the MIMO receiver transforms the orthonormal matrixes Q' and R' into orthogonal matrixes Q and R using a diagonalized normalization matrix $\Sigma^{-1/2}$ (operation S21).

That is, the MIMO receiver decomposes the orthonormal matrix Q' into an orthogonal matrix Q and a diagonalized normalization matrix $\Sigma^{-1/2}$, and decomposes the diagonalized normalization matrix $\Sigma^{-1/2}$ into an orthogonal matrix R.

Here, the diagonalized normalization matrix $\Sigma^{-1/2}$ can be expressed by Equation 1, and is a matrix whose each diagonal element is the reciprocal of a norm of each column of the orthonormal matrix Q'. Also, an element q' of the orthonormal matrix Q' and an element q of the orthogonal matrix Q are in a relationship which can be expressed by Equation 2. Then, the MIMO receiver obtains the values of the elements of the orthogonal matrixes Q and R through an algorithm which is performed by the QR decomposition unit 14 illustrated in FIG. 1.

The MIMO receiver performs SIC using the orthogonal matrixes Q and R, thereby detecting a transmission signal transmitted from a transmitting party (operation S22).

Figure 3:
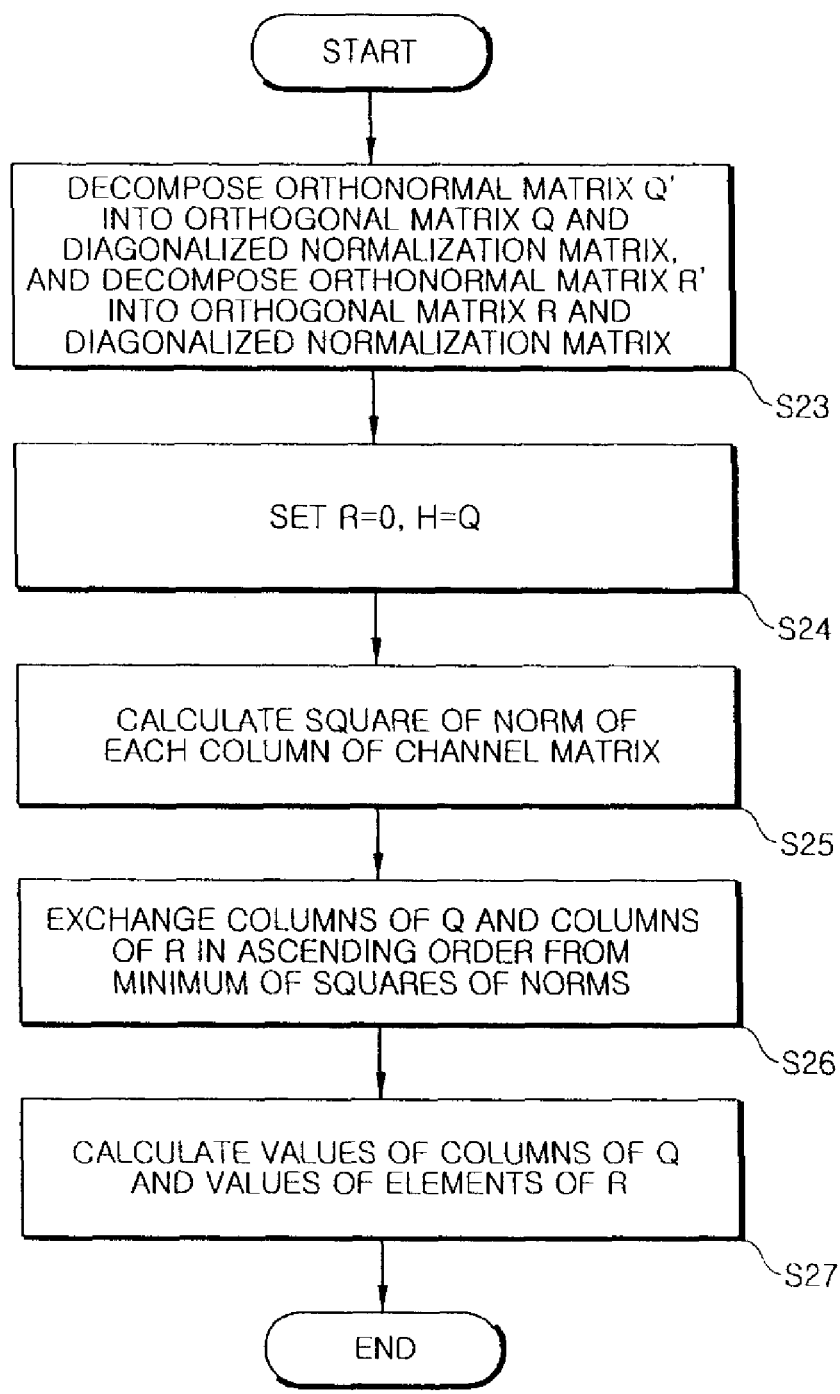
FIG. 3 is a flowchart of a matrix calculation method according to an embodiment of the present invention.

FIG. 3 is a flowchart of a matrix calculation method according to an embodiment of the present invention.

As illustrated in FIG. 3, the MIMO receiver decomposes an orthonormal matrix Q' into an orthogonal matrix Q and a diagonalized normalization matrix, and decomposes the orthonormal matrix R' into an orthogonal matrix R and a diagonalized normalization matrix (operation S23).

The MIMO receiver initializes the orthogonal matrix R, a channel matrix H, and the orthogonal matrix Q that R=0 and H=Q (operation S24).

The MIMO receiver calculates the square of a norm of each column of a channel matrix H (operation S25), and exchanges columns of the orthogonal matrix Q and columns of the orthogonal matrix R in an ascending order from a minimum of the squares of the norms (operation 26).

Then, the MIMO receiver obtains the values of the elements of the orthogonal matrixes Q and R whose columns have been exchanged (operation S27). That is, an element $r_{i,j}$ of the orthogonal matrix R is obtained using $q_i^H q_j$, and a column $q_j$ of the orthogonal matrix Q is obtained using $r_{i,j} q_j / r_{i,i}$, wherein i=1, ..., N (N is a natural number), j=i+1, ..., N (N is a natural number), and $q_i^H$ is the Hermitian of $q_i$. The matrixes R' and R can be expressed by Equation 3, and an element of the matrix R' can be expressed by Equation 4.

Operation S23 corresponds to step (1) of the algorithm which is performed by the QR decomposition unit 14 (see FIG. 1), and operations S24 through S27 are performed by repeatedly executing steps (2) through (15) of the algorithm in the QR decomposition unit 14.

As described above, in the signal detection method according to the current embodiment of the present invention, since the diagonalized normalization matrix $\Sigma^{-1/2}$ is eliminated when the transmission signal x is detected from the Equation $Q^H y=Rx$, the transmission signal x can be obtained without having to perform a square root calculation.

Accordingly, since no complicated square root calculation is needed, the complexity of a calculation for detecting a transmission signal under a MIMO channel environment can be reduced.

Figure 4:
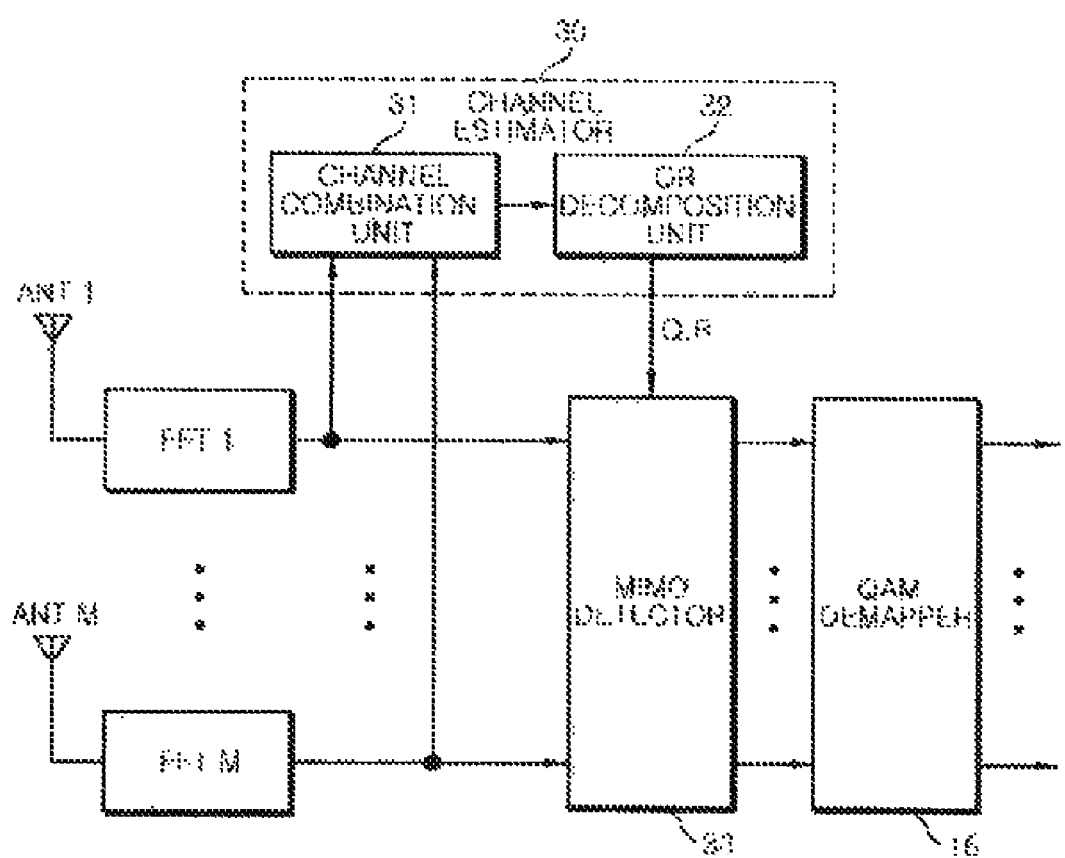
FIG. 4 is a block diagram of a MIMO receiver according to another embodiment of the present invention.

FIG. 4 is a block diagram of a MIMO receiver according to another embodiment of the present invention.

The MIMO receiver illustrated in FIG. 4 decomposes an extended channel matrix including channel information and received noise information into orthonormal matrixes $\overline{Q}$ and $\overline{R}$ using a ZF-SQRD algorithm, selects some elements of the orthonormal matrix $\overline{Q}$ to generate an orthonormal subset matrix $\overline{Q1}$, transforms the orthonormal subset matrix $\overline{Q1}$ and the orthonormal matrix $\overline{R}$ into an orthogonal subset matrix $Q1$ and an extended matrix $\overline{R}$, using a diagonalized normalization matrix, and performs SIC using the transformed subset matrix $Q1$ and the extended matrix $R$, thereby detecting a transmission signal.

This operation will be described in detail with reference to FIG. 4 below.

Referring to FIG. 4, the MIMO receiver includes a plurality of receiving antennas ANT1, ..., ANTM, a plurality of Fast Fourier Transform (FFT) calculators FFT1 through FFTM which are respectively connected to the receiving antennas ANT1 through ANTM, a channel estimator 30, a MIMO detector 33, and a QAM demapper 16.

The FFT calculators FFT1 through FFTM perform FFT on signals received through the receiving antennas ANT1, ..., ANTM, to demodulate them into M pieces of channel data in a frequency domain.

The channel estimator 30 includes a channel combination unit 31 and a QR decomposition unit 32. The channel combination unit 31 generates a channel matrix H using the M pieces of channel data.

The QR decomposition unit 32 adds the received noise information to the channel matrix H, to generate an extended channel matrix, and decomposes the extended channel matrix into orthonormal matrixes $\underline{Q}$ and $\underline{R}$. The QR decomposition unit 32 selects some elements of the orthonormal matrix $\underline{Q}$ to generate an orthonormal subset matrix $\underline{Q1}$, and transforms the orthonormal subset matrix $\underline{Q1}$ and the orthonormal matrix $\underline{R}$ into an orthogonal subset matrix Q1 and an extended matrix R using a diagonalized normalization matrix.

Here, the diagonalized normalization matrix is a matrix whose each diagonal element is the reciprocal of a norm of each column of the orthonormal subset matrix $\underline{Q1}$.

An exemplary algorithm for obtaining the orthogonal subset matrix Q1 and the extended matrix R is as follows.

```
(1) R = 0, Q = H, p = (1,...,N)
(2) for i = 1,...,N
(3)     E_i = || q_i ||^2 + σ^2           Mult : 2M, Add : M
(4) end
(5) for i = 1,...,N
(6)     k_i = argmin_{s=i,...,N} E_s
(7)     exchange column i and k_i in H, Q, R, and p, E
(8)     r_{i,i} = E_i
(9)     if (i < N) u_i = 1/r_{i,i}         Div : 1
(10)    for j = i + 1,...,N
(11)        r_{i,j} = q_i^H q_j            Mult : 3M, Add: 2M–2
(12)        q_j = q_j – u_i r_{i,j} q_i    Mult: 3M+2, Add: 2M
(13)        E_j = E_j – u_i r_{i,j}^2      Mt: 3, Add: 1
(14)    end
(15) end
```

First, the QR decomposition unit 32 initializes the extended orthogonal matrix R, the channel matrix H, the orthogonal subset matrix Q1, and a permutation value p that R=0, H=Q1, and p=1, ..., N, in step (1) of the algorithm.

Then, in steps (2) through (15) of the algorithm, the QR decomposition unit 32 adds a value of the square of received noise (σ) to the square of a norm of each column of the channel matrix H, to obtain power values E, and exchanges the columns of the orthogonal subset matrix Q1 and the columns of the extended orthogonal matrix R in an ascending order from a minimum of the power values, and calculates the values of the columns of the orthogonal subset matrix Q1 and the values of the elements of the extended orthogonal matrix R.

Thus, an element $r_{i,j}$ of the extended orthogonal matrix R is obtained using $q_i^H q_j$, and a column $q_j$ of the orthogonal subset matrix Q1 is obtained using $r_{i,j} q_i / r_{i,i}$, wherein i=1, ..., N (N is a natural number), j=i+1, ..., N (N is a natural number), and $q_i^H$ is the Hermitian of $q_i$.

Then, the MIMO detector 33 performs SIC using the orthogonal subset matrix Q1 and the extended orthogonal matrix R which are obtained by the channel estimator 30, thereby detecting a transmission signal x.

This operation will be described in detail below.

A received signal y can be expressed by a multiplication (y=Hx) of an extended channel matrix $\underline{H}$ and a transmission signal x.

Since the extended channel matrix $\underline{H}=\underline{QR}=\underline{Q1}\Sigma^{-1/2}\Sigma^{-1/2}R$, $y=\underline{H}x=\underline{Q1}Rx=\underline{Q1}\Sigma^{-1/2}\Sigma^{-1/2}R\overline{x}$. Here, since $(\underline{Q1}\Sigma^{-1/2})^H y = (\underline{Q1}\Sigma^{-1/2})^H(\underline{Q1}\Sigma^{-1/2})\Sigma^{-1/2}Rx$, $\Sigma^{-1/2}\underline{Q1}^H y = \Sigma^{-1/2}Rx$, and $\underline{Q1}^H y = Rx$, the transmission signal x can be obtained using the Equation $Q1^H y = Rx$. That is, in the MIMO receiver according to the current embodiment of the present invention, since the diagonized normalization matrix $\Sigma^{-1/2}$ is eliminated when the transmission signal x is calculated by the Equation $Q^H y = Rx$, the transmission signal x can be obtained without having to perform a square root calculation on the orthogonal subset matrix Q1 and the expended orthogonal matrix R.

Accordingly, since no complicated square root calculation is needed, the complexity of a calculation for detecting a transmission signal under a MIMO channel environment can be reduced.

The QAM demapper 16 maps the M pieces of channel data to the original bit data according to a QAM modulation method.

Figure 5:
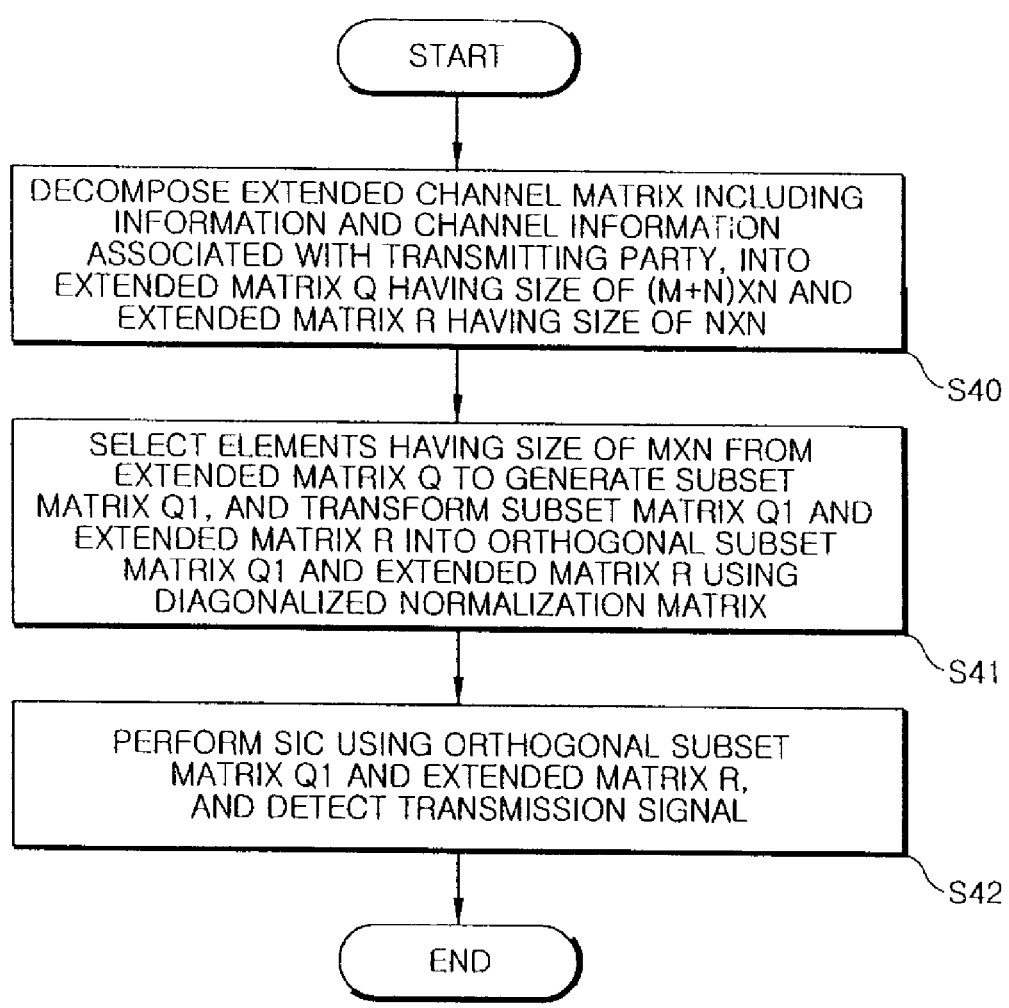
FIG. 5 is a flowchart of a signal detection method which is performed by the MIMO receiver illustrated in FIG. 4, according to another embodiment of the present invention.

FIG. 5 is a flowchart of a signal detection method which is performed by the MIMO receiver illustrated in FIG. 4, according to another embodiment of the present invention.

As illustrated in FIG. 5, the MIMO receiver adds received noise to a channel matrix associated with a transmitting party to generate an extended channel matrix, and decomposes the extended channel matrix into extended matrixes $\underline{Q}$ and $\underline{R}$ (operation S40). If the channel matrix has a size of $\overline{M} \times N$, the extended channel matrix has a size of (M+N)×N because it includes the received noise $sI_N$, and the extended matrix $\underline{R}$ has a size of N×N.

The relationship can be expressed by Equation 5.

$$\underline{H} = \begin{bmatrix} H \\ \sigma I_N \end{bmatrix} = \underline{QR} = \begin{bmatrix} Q_1 \\ Q_2 \end{bmatrix} R = \begin{bmatrix} Q_1 R \\ Q_2 R \end{bmatrix}, \quad (5)$$

where $\underline{H}$ represents the extended channel matrix, H represents the channel matrix, $sI_N$ represents the received noise, $\underline{Q}$ and $\underline{R}$ represent the extended matrixes, respectively, and $\overline{s}$ represents a standard deviation of the received noise.

The MIMO receiver selects some elements of the extended matrix $\underline{Q}$ to generate an orthonormal subset matrix $\underline{Q1}$. Here, the orthonormal subset matrix $\underline{Q1}$ has a size of $\overline{M} \times N$, and corresponds to $Q_1$ in Equation 1.

Hereinafter, the MIMO receiver obtains an orthogonal subset matrix Q1 and an extended matrix R through an algorithm which is performed by the QR decomposition unit 32 of FIG. 4 (operation S41), and performs SIC using the orthogonal subset matrix Q1 and the extended matrix R, thereby detecting a transmission signal which has been transmitted from a transmitting party (operation S42).

Figure 6:
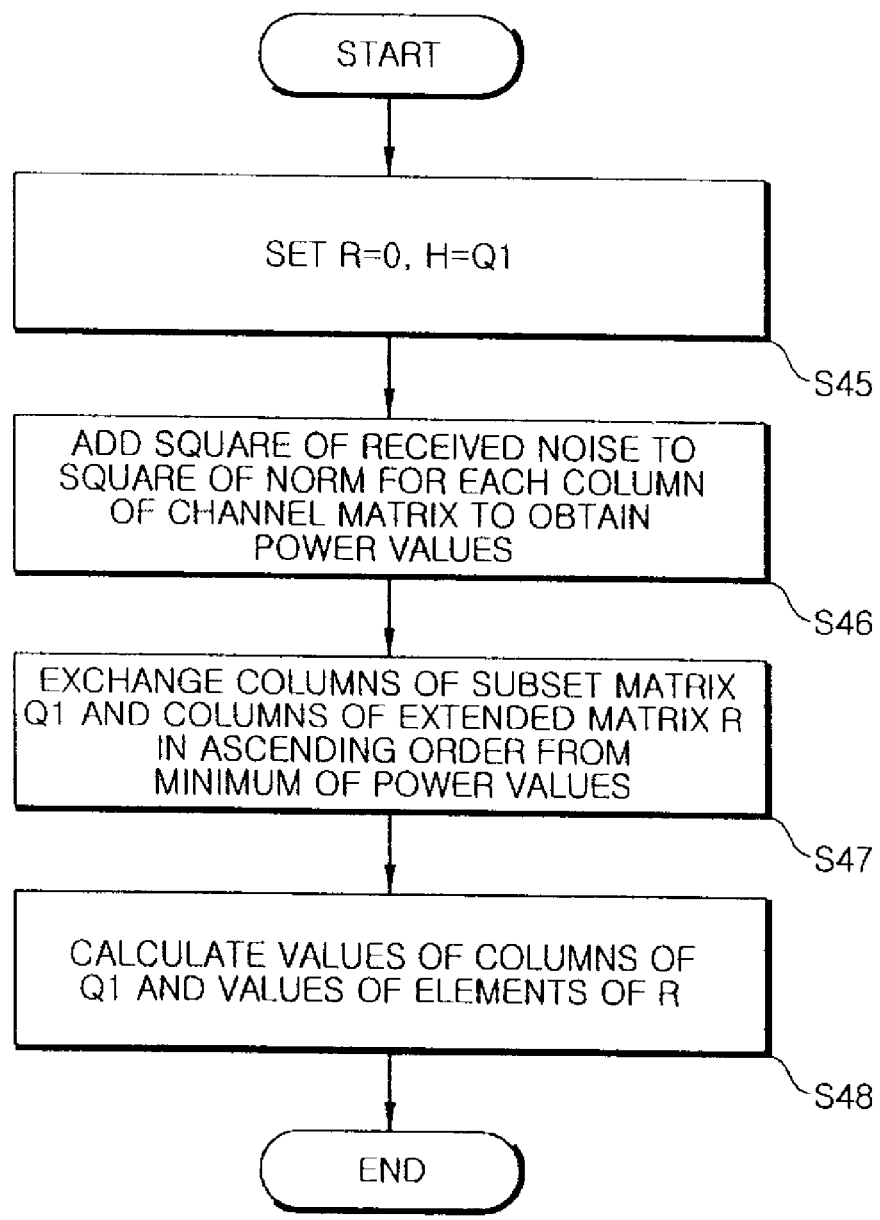
FIG. 6 is a flowchart of a matrix calculation method according to another embodiment of the present invention.

FIG. 6 is a flowchart of a matrix calculation method according to another embodiment of the present invention.

As illustrated in FIG. 6, the MIMO receiver initializes an extended orthogonal matrix R, a channel matrix H, and an orthogonal subset matrix Q1 so that R=0 and H=Q1 (operation S45).

The MIMO receiver adds the square of received noise to the square of a norm of each column of the channel matrix H to calculate power values (operation S46), and exchanges the columns of the channel matrix H, the columns of the orthogonal subset matrix Q1, and the columns of the extended matrix R in an ascending order from a minimum of the power values (operation S47).

Then, the MIMO receiver calculates the values of the columns of the orthogonal subset matrix Q1 and the values of the elements of the extended matrix R (operation S48).

Here, an element $r_{i,j}$ of the extended matrix R is obtained using $q_i^H q_j$, and a column $q_j$ of the orthogonal subset matrix Q1 is obtained using $r_{i,j} q_i / r_{i,i}$, wherein i=1, ..., N (N is a natural number), j=i+1, ..., N (N is a natural number), and $q_i^H$ is the Hermitian of $q_i$.

Here, operation S42 corresponds to step (1) of the algorithm which is performed by the QR decomposition unit 32 (see FIG. 4), and operations S43, S44, and S45 are performed by repeatedly executing steps (2) through (15) of the algorithm in the QR decomposition unit 32.

As described above, in the signal detection method according to the current embodiment of the present invention, since a diagonalized normalization matrix $\Sigma^{-1/2}$ is eliminated when a transmission signal x is detected from Equation $Q1^H y = Rx$, the transmission signal x can be obtained without having to perform a square root calculation on the orthogonal subset matrix Q1 and the extended matrix R.

Accordingly, since no complicated square root calculation is needed, the complexity of a calculation for detecting a transmission signal under a MIMO channel environment can be reduced.

Hereinafter, effects of the signal detection methods according to the embodiments of the present invention illustrated in FIGS. 2 and 5 will be compared with a conventional signal detection method.

In the conventional signal detection method, a channel matrix H is decomposed into matrixes Q and R, and the matrixes Q and R are obtained using the following algorithm.

```
(1) R = 0, Q = H, p = (1,...,N)
(2) for i = 1,...,N
(3)     E_i = || q_i ||^2            Mult : 2M, Add : M-1
(4) end
(5) for i = 1,...,N
(6)     k_i = argmin_{s=i,...,N} E_s
(7)     exchange column i and k_i in Q, R, p, E
(8)     r_{i,i} = √E_i                Sqrt: 1
(9)     d_i = 1/r_{i,i}               Div: 1
(10)    q_i = q_i d_i                 Mult: 2M
(11)    for j = i + 1,...,N
(12)        r_{i,j} = q_i^H q_j       Mult : 3M, Add: 2M-2
(13)        q_j = q_j - r_{i,j} q_i   Mult: 3M, Add: 2M
(14)        E_j = E_j - r_{i,j}^2     Mult: 2, Add: 1
(15)    end
(16) end
```

In step (1), the decomposed matrixes R and Q are initialized so that R=0 and Q=H. Then, in steps (2) through (16), the square of a norm of each column of the channel matrix H is calculated. The columns of the matrix Q and the columns of the matrix R are exchanged in an ascending order from a minimum of the squares of the norms. Then, the values of the columns of the matrix Q and the values of the elements of the matrix R are calculated. Then, SIC is performed using the matrixes Q and R, so that a transmission signal is detected.

However, the conventional signal detection method necessarily requires complicated square root calculations and division calculations, such as steps (8) and (9). Accordingly, the conventional signal detection method has a disadvantage in that the complexity of a calculation for detecting a transmission signal increases.

In more detail, the signal detection method according to this embodiment of the present invention will be compared in view of complexity with the convention signal detection method below.

The terms "Mult", "Add", and "Div" in the algorithm used for the signal detection method according to this embodiment of the present invention and in an algorithm used for the conventional signal detection method represent a real multiplication, a real addition, and a real division, respectively.

The algorithm used for the signal detection method according to this embodiment of the present invention requires no square root calculation, unlike the algorithm used for the convention signal detection method. That is, the algorithm used in the signal detection method according to this embodiment of the present invention does not need to perform steps (8), (9), and (10) of the algorithm used for the conventional signal detection method.

The complexity of the signal detection method according to this embodiment of the present invention will now be compared with the complexity of the conventional signal detection method.

For the comparison, a complex multiplication is considered as three real multiplications, a magnitude is considered as two real multiplications, and any other calculation is not considered.

The algorithm used for the signal detection method according to this embodiment of the present invention can be expressed by Table 1. The complexity of the ZF-SQRD algorithm according to this embodiment of the present invention which is described above with reference to FIGS. 1 through 4, and the complexity of a Minimum Mean Square Error Sorted QR Decomposition (MMSE-SQRD) algorithm which is described above with respect to FIGS. 4 through 6, can be expressed by Table 1.

TABLE 1

| Present Invention | Complexity |
|---|---|
| ZF-SQRD | $3MN^2 - MN + 2.5N^2 - 2.5N$ |
| MMSE-SQRD | $3MN^2 - MN + 2.5N^2 - 2.5N$ |

As seen in Table 1, the complexity of the ZF-SQRD algorithm is equal to the complexity of the MMSE-SQRD algorithm. In consideration of addition, the MMSE-SQRD algorithm according to this embodiment of the present invention, unlike the ZF-SQRD algorithm according to this embodiment of the present invention, adds only a variance of received noise to the square of a norm of each column of a subset matrix as in step (3) of the algorithm performed by the QR decomposition unit 14 illustrated in FIG. 1.

The complexity of the signal detection method according to this embodiment of the present invention and the complexity of the conventional signal detection method are shown in Table 2.

TABLE 2

|  | SQRT | Conventional Method | Present Invention |
|---|---|---|---|
| ZF | 0 | $3MN^2 + MN + N^2 - N$ | $3MN^2 - MN + 2.5N^2 - 2.5N$ |
| ZF | 1 | $3MN^2 + MN + N^2$ | — |
| ZF | 3 | $3MN^2 + MN + N^2 + 2N$ | — |
| MMSE | 0 | $3MN^2 + N^3 + MN + N^2 - 2N$ | $3MN^2 - MN + 2.5N^2 - 2.5N$ |
| MMSE | 1 | $3MN^2 + N^3 + MN + N^2 - N$ | — |
| MMSE | 3 | $3MN^2 + N^3 + MN + N^2 + N$ | — |

In Table 2, in the case of M=N=4, complexity can be measured as in Table 3. That is, Table 3 shows complexity when the number M of receiving antennas is 4 and the number N of transmitting antennas is 4.

TABLE 3

|  | SQRT | Conventional Method | Present Invention |
|---|---|---|---|
| ZF | 0 | 220 | 206 |
|  | 1 | 224 | — |
|  | 3 | 232 | — |
| MMSE | 0 | 280 | 206 |
|  | 1 | 284 | — |
|  | 3 | 292 | — |

As seen in Table 3, the complexity of the signal detection method according to this embodiment of the present invention is lower than the complexity of the conventional signal detection method.

In general, a square root calculation requires multiple clock signals or multiple operations when it is performed by register transfer logic (RTL) or used for digital signal processing. However, these requirements make the structure of the whole system complex.

Therefore, unlike the conventional signal detection method, the signal detection method according to this embodiment of the present invention reduces the complexity of a process for detecting a transmission signal, and thus makes implementation of a system easier because no square root calculation needs to be performed to detect the transmission signal.

As described above, according to the embodiments of the present invention, since no square root calculation needs to be performed when a calculation for detecting a transmission signal is performed using a ZF-SQRD algorithm and a MMSE-SQRD algorithm, it is possible to reduce the complexity of a calculation for detecting a transmission signal under a MIMO channel environment.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A Multiple Input Multiple Output (MIMO) receiver comprising:
    a channel estimator decomposing a channel matrix including channel information associated with a transmitting party into orthonormal matrixes Q' and R', and transforming the decomposed orthonormal matrixes Q' and R' into orthogonal matrixes Q and R using a diagonalized normalization matrix; and
    a detector performing Successive Interference Cancellation (SIC) using the orthogonal matrixes Q and R, thus detecting a transmission signal transmitted from the transmitting party.

2. The MIMO receiver of claim 1, wherein the channel estimator obtains the orthogonal matrixes Q and R by using the diagonalized normalization matrix, without having to perform a square root calculation.

3. The MIMO receiver of claim 1, wherein the diagonalized normalization matrix is a matrix whose each diagonal element is a reciprocal of a norm of each column of the orthogonal matrix Q.

4. The MIMO receiver of claim 1, wherein the channel estimator calculates a square of a norm of each column of the channel matrix, exchanges columns of each of the orthogonal matrixes Q and R in an ascending order from a minimum of squares of norms for columns of the channel matrix, and calculates values of the columns of the orthogonal matrix Q whose columns are exchanged and values of elements of the orthogonal matrix R whose columns are exchanged.

5. The MIMO receiver of claim 4, wherein the channel estimator obtains an element $r_{i,j}$ of the orthogonal matrix R whose columns are exchanged, using $q_i^H q_j$, and obtains a column $q_j$ of the orthogonal matrix Q whose columns are exchanged, using $r_{i,j} q_i / r_{i,i}$, wherein i=1, ..., N (N is a natural number), j=i+1, ..., N, and $q_i^H$ is the Hermitian of $q_i$.

6. A Multiple Input Multiple Output (MIMO) receiver comprising:
    a channel estimator decomposing an extended channel matrix including received noise information and channel information associated with a transmitting party into extended orthonormal matrixes Q and R, selecting some elements of the extended orthonormal matrix Q to generate an orthonormal subset matrix Q1, and transforming the orthonormal subset matrix Q1 and the extended orthonormal matrix R into an orthogonal subset matrix Q1 and an extended matrix R using a diagonalized normalization matrix; and
    a detector performing Successive Interference Cancellation (SIC) using the orthogonal subset matrix Q1 and the extended matrix R, thus detecting a transmission signal transmitted from the transmitting party.

7. The MIMO receiver of claim 6, wherein the channel estimator obtains the orthogonal subset matrix Q1 and the extended matrix R without having to perform a square root calculation.

8. The MIMO receiver of claim 6, wherein the diagonalized normalization matrix is a matrix whose each diagonal element is a reciprocal of a norm of each column of the orthonormal subset matrix Q1.

9. The MIMO receiver of claim 6, wherein the channel estimator adds a square of the received noise information to a square of a norm of each column of the channel matrix, to obtain power values, exchanges columns of the channel matrix, columns of the orthogonal subset matrix Q1, and columns of the extended matrix R in an ascending order from a minimum of the power values, and calculates values of the columns of the orthogonal subset matrix Q1 whose columns are exchanged, and values of elements of the extended matrix R whose columns are exchanged.

10. The MIMO receiver of claim 9, wherein the channel estimator obtains an element $r_{i,j}$ of the extended matrix R whose columns are exchanged, using $q_i^H q_j$, and obtains a column $q_j$ of the orthogonal subset matrix Q1 whose columns are exchanged, using $r_{i,j} q_i / r_{i,i}$, wherein i=1, ..., N (N is a natural number), j=i+1, ..., N, and $q_i^H$ is the Hermitian of $q_i$.

11. A method of detecting a signal in a Multiple Input Multiple Output (MIMO) receiver, comprising:
    decomposing a channel matrix including channel information associated with a transmitting party, into orthonormal matrixes Q' and R';
    transforming the orthonormal matrixes Q' and R' into orthogonal matrixes Q and R using a diagonalized normalization matrix; and
    performing Successive Interference Cancellation (SIC) using the orthogonal matrixes Q and R, thus detecting a transmitting matrix transmitted from the transmitting party.

12. The method of claim 11, wherein the transforming of the orthonormal matrixes Q' and R' into the orthogonal matrixes Q and R comprises obtaining the orthogonal matrixes Q and R using the diagonalized normalization matrix, without having to perform a square root calculation.

13. The method of claim 11, wherein the diagonalized normalization matrix is a matrix whose each diagonal element is a reciprocal of a norm of each column of the orthogonal matrix Q.

14. The method of claim 11, wherein the transforming of the orthonormal matrixes Q' and R' into the orthogonal matrixes Q and R comprises:

decomposing the orthonormal matrix Q' into the orthogonal matrix Q and a diagonalized normalization matrix, and decomposing the orthonormal matrix R' into the orthogonal matrix R and a diagonalized normalization matrix;

calculating a square of a norm of each column of the channel matrix;

exchanging columns of the orthogonal matrix Q and columns of the orthogonal matrix R in an ascending order from a minimum of squares of norms for columns of the channel matrix; and calculating values of the columns of the orthogonal matrix Q whose columns are exchanged, and values of elements of the orthogonal matrix R whose columns are exchanged.

15. The method of claim 14, wherein the calculating of the values of the columns of the orthogonal matrix Q and the values of the elements of the orthogonal matrix R comprises obtaining an element $r_{i,j}$ of the orthogonal matrix R using $q_i^H q_j$, and obtaining a column $q_j$ of the exchanged orthogonal matrix Q using $r_{i,j} q_i / r_{i,i}$, wherein i=1, . . . , N (N is a natural number), j=i+1, . . . , N, and $q_i^H$ is the Hermitian of $q_i$.

16. A method of detecting a signal in a Multiple Input Multiple Output (MIMO) receiver, comprising:

decomposing an extended channel matrix including received noise information and channel information associated with a transmitting party, into extended orthonormal matrixes $\underline{Q}$ and $\underline{R}$;

selecting some elements of the extended orthonormal matrix $\underline{Q}$ to generate an orthonormal subset matrix Q1, and transforming the orthonormal subset matrix Q1 and the extended orthonormal matrix $\underline{R}$ into an orthogonal subset matrix Q1 and an extended matrix R, using a diagonalized normalization matrix; and performing Successive Interference Cancellation (SIC) using the orthogonal subset matrix Q1 and the extended matrix R, thus detecting a transmission signal transmitted from the transmitting party.

17. The method of claim 16, wherein the selecting of some elements of the extended orthonormal matrix $\underline{Q}$ comprises obtaining the orthogonal subset matrix Q1 and the extended matrix R without performing a square root calculation.

18. The method of claim 16, wherein the diagonalized normalization matrix is a matrix whose each diagonal element is a reciprocal of a norm of each column of the orthonormal subset matrix Q1.

19. The method of claim 16, wherein the selecting of some elements of the extended orthonormal matrix $\underline{Q}$ comprises:

adding a square of the received noise information to a square of a norm of each column of the channel matrix to obtain power values;

exchanging columns of the channel matrix, columns of the orthogonal subset matrix Q1, and columns of the extended matrix R in an ascending order from a minimum of the power values; and calculating values of the columns of the orthogonal subset matrix Q1 whose columns are exchanged, and values of elements of the extended matrix R whose columns are exchanged.

20. The method of claim 19, wherein the calculating of the values of the columns of the orthogonal subset matrix Q1 and the values of the elements of the extended matrix R comprises obtaining a column $q_j$ of the orthogonal subset matrix Q1 whose columns are exchanged, using $q_i^H q_j$, and obtaining an element $r_{i,j}$ of the extended matrix R whose columns are exchanged, using $r_{i,j} q_i / r_{i,i}$, wherein i=1, . . . , N (N is a natural number), j=i+1, . . . , N, and $q_i^H$ is the Hermitian of $q_i$.

* * * * *